US007813335B2

(12) United States Patent
Terpstra et al.

(10) Patent No.: US 7,813,335 B2
(45) Date of Patent: Oct. 12, 2010

(54) INTERNET PROTOCOL TRUNK GROUPS

(75) Inventors: Richard Terpstra, Superior, CO (US);
Greg Gualtieri, Denver, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 11/755,604

(22) Filed: May 30, 2007

(65) Prior Publication Data
US 2008/0056244 A1 Mar. 6, 2008

Related U.S. Application Data

(60) Provisional application No. 60/823,935, filed on Aug. 30, 2006.

(51) Int. Cl.
*H04L 12/66* (2006.01)
(52) U.S. Cl. .................. 370/352; 370/230; 370/355; 370/356; 370/357; 370/465
(58) Field of Classification Search ................ 370/352, 370/353
See application file for complete search history.

(56) References Cited

U.S. PATENT DOCUMENTS

| 5,509,049 | A | 4/1996 | Peterson |
| 6,442,169 | B1 | 8/2002 | Lewis |
| 6,614,781 | B1 | 9/2003 | Elliott et al. |
| 6,914,900 | B1 * | 7/2005 | Komatsu et al. ............. 370/356 |
| 7,200,150 | B2 | 4/2007 | Lewis |
| 7,564,840 | B2 | 7/2009 | Elliott et al. |
| 7,720,081 | B2 | 5/2010 | Lewis |
| 2006/0072554 | A1* | 4/2006 | Farahmand et al. ......... 370/352 |
| 2006/0072555 | A1* | 4/2006 | St. Hilaire et al. .......... 370/352 |
| 2008/0013531 | A1 | 1/2008 | Elliott et al. |
| 2008/0025294 | A1 | 1/2008 | Elliott et al. |
| 2008/0025295 | A1 | 1/2008 | Elliott et al. |

OTHER PUBLICATIONS

International Searching Authority, U.S. Patent and Trademark Office and Receiving Office, International Search Report (Form PCT/ISA/220) for international application No. PCT/US07/77138, International Filing Date: Aug. 29, 2007, 5 pages.
International Searching Authority, U.S. Patent and Trademark Office and Receiving Office, Written Opinion of the International Searching Authority (Form PCT/ISA/237) for international application No. PCT/US07/77138, International filing Date: Aug. 2007, 5 pages.

(Continued)

*Primary Examiner*—Curtis Kuntz
*Assistant Examiner*—Phung-Hoang J Nguyen
(74) *Attorney, Agent, or Firm*—John C. Heuton

(57) ABSTRACT

A system includes a core routing engine operable to receive a call setup request and identify one or more IP trunk groups through which the call setup request can be routed, select one of the one or more identified IP trunk groups and route the call setup request to an internal IP address associated with the selected IP trunk group. The system may further include an IP edge node associated with the internal IP address, the IP edge node in the backbone network and operable to receive the call setup request and route the call setup request to one of a plurality of IP addresses associated with a plurality of carrier edge nodes in the carrier network.

25 Claims, 10 Drawing Sheets

OTHER PUBLICATIONS

U.S. Appl. No. 12/781,801, filed May 17, 2010 to Lewis, Shawn M.
International Searching Authority, Korean Intellectual Property Office, International Search Report and Written Opinion for international application No. PCT/08/083903, International Filing Date: Nov. 18, 2008, 7 pages.

\* cited by examiner

| | Attribute | Value | Constraints | |
|---|---|---|---|---|
| 608 | Trunk Group ID (TGID) | 123456 | S | U |
| 610 | Internal IP data | 255.255.25.255:5555 UDP | S | N |
| 612 | Facility name | LAABCD002 | S | N |
| 614 | External IP data | 2.255.25.25:5555 UDP | S | N |
| 616 | Carrier IP data | 255.25.255.25:5555 UDP | M | N |
| 618 | Carrier facility name | SIPPROXYLA05 | M | N |
| 620 | TG size | 040 | S | N/A |
| 622 | PCC (CPV) | 10511 | S | N |
| 624 | E911 type | Traditional | S | N/A |
| 626 | TG route advance profile | 001 | S | N/A |
| 628 | Signaling normalization profile | 001 | S | N/A |
| 630 | Directionality | B | S | N/A |
| 632 | Hunt sequence | P | S | N/A |
| 634 | Regulatory nature | E | S | N/A |
| 636 | Carrier ID | 4321 | S | N/A |
| 638 | Allowable Codecs | G.711 20ms, G.729a 30ms, G.723 30ms | M | N |
| 640 | Product ID | 1234 | S | N/A |
| 642 | Interconnection type | Type X | S | N/A |
| 644 | Load balancer IP data | 1.234.56.78:5555 UDP | S | N |
| 646 | Load balancer type | Redirect | S | N/A |
| 648 | Carrier equipment data | Sonus NBS | S | N |

FIG. 6

INTERNET PROTOCOL TRUNK GROUPS

CROSS-REFERENCE TO RELATED APPLICATIONS

This patent application claims the benefit of priority to Provisional Patent Application Ser. No. 60/823,935 entitled "Internet Protocol Trunk Groups", filed Aug. 30, 2006, which is incorporated herein by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2006 Level 3 Communications, LLC.

TECHNICAL FIELD

Embodiments of the present invention generally relate to communications through a network. More specifically, embodiments relate to defining logical groups of IP interconnections that have useful commonalities, and using the defined IP interconnection groups to route calls through one network to another network.

BACKGROUND

In the field of network communications, Voice over Internet Protocol (VoIP) calls are typically setup over multiple networks, such as a backbone network and one or more customer or carrier networks. Typically, when a call request enters the backbone network, a core routing device determines how to most efficiently route the call out of the backbone network to the customer network. The core routing device chooses among a number of edge devices on the backbone network that interconnect with edge devices on the customer network. The choice of which edge device to route to within the backbone network is typically based on the called telephone number and/or an associated IP address. A routing tree of customer telephone numbers and customer IP addresses is accessed to determine the outbound edge device. In conventional systems, one or more outbound edge devices on the backbone network are dedicated to each customer network. For example, the routing trees, as well as other customer network-related data, are typically hard-coded in the backbone edge devices. Such dedicated approaches have drawbacks related to lack of flexibility, lack of scalability, and heightened sensitivity to customer network changes.

When outbound devices are dedicated to a customer, devices that perform call routing functions in the interior of the backbone network often need to be aware of (e.g., programmed with) details of the interconnections to customer network. For example, a core routing engine may need to have information about particular IP addresses that can be directly reached by the outbound edge devices. Such an arrangement tends to make the core routing devices inefficient because these devices often need to perform relatively complex processing to determine which outbound devices to use to route calls. In addition, the core router configuration is highly sensitive to changes in IP addresses on the customer network. Conventionally, the outbound devices have not shielded the core routing equipment from changes, but rather, a change to the customer network often ripples through the backbone network, requiring changes at multiple levels of the infrastructure.

Changes to network interconnections can also impact other aspects of telecommunications service, such as billing and operations. For example, IP addresses on the customer network may be associated with bills that are issued by the backbone network service provider to the customer network provider. When IP addresses change, if the billing system is not promptly updated, then bills may be wrong; e.g., the bills may not correspond to the actual number of VoIP addresses being serviced. There often is a separation between the update to the backbone network infrastructure and the other business processes, so that the change will need to be made not only in the outbound edge devices, to maintain proper routing, but also in the billing systems, operations, and others. As such, customization to the customer network necessitates changes in various aspects of the backbone network. However, conventional approaches toward responding to such customer changes have generally not been coordinated or efficient.

It is with respect to these and other considerations that embodiments of the present invention have been made.

BRIEF DESCRIPTION OF THE DRAWINGS

FIG. 6 illustrates a data structure with attributes, values, and constraints that can be used to define IP trunk groups in accordance with one embodiment.

Figure 1:
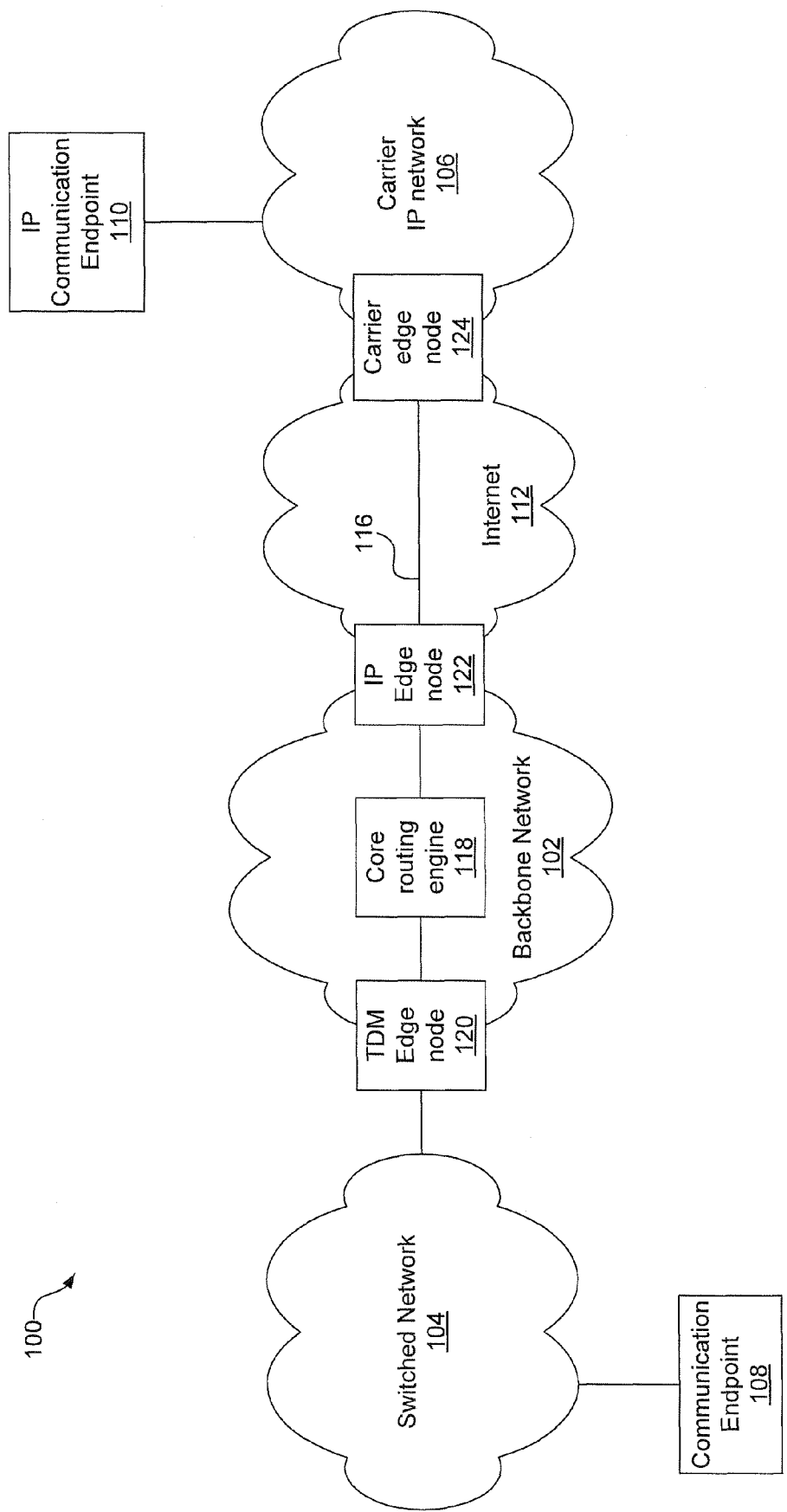
FIG. 1 illustrates an exemplary operating environment within which embodiments of the invention can operate to define and use Internet Protocol (IP) trunk groups for routing calls from one network to another.

While the invention is amenable to various modifications and alternative forms, specific embodiments have been shown by way of example in the drawings and are described in detail below. The intention, however, is not to limit the invention to the particular embodiments described.

DETAILED DESCRIPTION

Embodiments of the present invention relate to systems and methods for defining trunk groups for use in an Internet protocol (IP) environment. More specifically, embodiments relate to identifying IP interconnections that have common characteristics which can be included in an IP trunk group definition. IP trunk groups that are defined can be used by one or more core routing engines to route incoming calls to outbound IP trunk groups. Based on IP trunk group traffic distribution policies, inbound calls are distributed across IP edge nodes, which may perform traffic distribution across carrier network edge nodes.

Prior to describing one or more preferred embodiments of the present invention, definitions of some terms used throughout the description are presented.

Definitions

The term "Internet protocol trunk group" or "IP trunk group" refers to a group of one or more IP interconnections that have similar attributes. The one or more IP interconnections can be identified by an IP trunk group (IPTG) identifier.

The term "IP interconnection" refers to a logical path between two IP addresses over an IP network and endpoints at each end of the logical path. An IP interconnection may include numerous physical paths through the IP network (e.g., different paths for different packets).

A "module" is a self-contained functional component. A module may be implemented in hardware, software, firmware, or any combination thereof.

The terms "connected" or "coupled" and related terms are used in an operational sense and are not limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

Exemplary System

FIG. 1 illustrates an exemplary operating environment 100, which is suitable for employing Internet protocol trunk groups (IPTG) in accordance with one embodiment. IPTGs can introduce a level of abstraction between the interior infrastructure of a backbone network and customer networks, to which the backbone network routes calls. In this regard, the IPTGs can insulate interior infrastructure from customer network changes. In addition, IPTGs bundle various types of information about IP interconnections that can be used by various systems associated with the backbone network. As such, IPTGs can allow for scalability across the systems.

Embodiments described herein are directed at Voice over IP (VoIP), Session Initiation Protocol (SIP), and related technologies for purposes of illustration, although it will be understood by those skilled in the art that IPTGs and related concepts can be applied to other communication environments and protocols.

In the embodiment of FIG. 1, a backbone network 102 provides communications services between users who may access the same or different communication networks, such as a switched network 104 and a carrier IP network 106. The switched network 104 could include the Public Switched Telephone Network (PSTN), a local exchange carrier (LEC) network, cellular networks, and/or an emergency services network. The carrier IP network 106 could include an Internet Service Provider (ISP) network, an autonomous system, or other customer carrier network. A plurality of communication endpoints 108 are used to access the switched network 104, while a plurality of IP communication endpoints 110 are used to access the carrier IP network 106. Communication endpoints 108 could include, without limitation, conventional telephones, cellular telephones, facsimile machines (Fax), MODEMs, or telephones on a private branch exchange (PBX). IP communication endpoints 110 could include, without limitation, VoIP phones, soft phones, conference servers, IP interactive voice response (IVR) platforms, or terminal adaptors.

Calls routed by the backbone network 102 to the carrier IP network 106 are routed through a publicly accessible IP network, such as the Internet 112. Communications through the Internet 112 can be public or private. For example, Communications may by privately communicated over the Internet via an IP virtual private network (VPN). It will be understood that one or more of the switched network 104, the backbone network 102, the Internet 112, and the carrier IP networks 106 could be composed of multiple sub-networks.

In one scenario, calls are communicated between the switched network 104 and the backbone network 102 in one format and/or protocol, while calls are communicated between the backbone network 104 and the carrier networks 106 in another format and/or protocol. As such, among other functions, the backbone network 102 performs translation of the calls between the protocol of the switched network 104 and the Internet Protocol of the carrier networks 106. In other scenarios, calls can be communicated between IP communication endpoints 110 on one or more IP-based carrier networks 106.

In the embodiment of FIG. 1, calls between the switched network 104 and the backbone network 102 are communicated using Time-division Multiplexing (TDM). More specifically, multiple TDM trunk groups facilitate the interface between the backbone network 102 and the switched network 104.

Multiple IP interconnections exist between the backbone network 102 and the carrier IP networks 106 to facilitate call communication between these networks over the Internet 112. As is known, communications over the Internet are packetized, and packets of a single communication could take multiple different paths through the Internet. When the packets reach their destination, they are reassembled. An IP interconnection includes two end nodes and the logical path formed between them by the one or more paths through the Internet that packets of a communication take. Multiple IP trunk groups 116 may be defined over sets of the IP interconnections, as is described in further detail below. Using the IPTGs 116, interior systems of the backbone network 102 can efficiently route calls from the switched network 104 and the carrier IP networks 106 and vice versa. The backbone network 102 can also route calls from one IP-based network 106 to another IP-based network 106.

More specifically, core routing engines (CREs) 118 in the backbone network 102 route calls from TDM edge nodes 120 to IP edge nodes 122 or from IP edge nodes 122 to other IP edge nodes 122. IP edge nodes 122 route the received calls to carrier edge nodes 124. The TDM edge nodes 120 and the IP edge nodes are typically gateway devices. In various embodiments, media gateways on the edge of the backbone network 102 are controlled by media gateway controllers. The media gateways and the media gateway controllers may or may not be separate devices. IP media gateways may be referred to as session border controllers (SBCs). Media gateways (MGs), MG controllers and other associated components are available and are manufactured and distributed by various equipment providers such as Sonus™ and Lucent™, just to name a few. The present invention is certainly not limited to any certain brand name, but rather various embodiments may be implemented using any one or more of these known providers.

When a CRE 118 receives call requests (e.g., SIP requests or INVITEs) from a TDM edge node 120, in general, the CRE 118 chooses among multiple IP edge nodes 122 through which to route the call requests. The determination as to which of multiple IP edge nodes 122 to choose is fundamentally based on the called telephone number in the request. The called telephone number dictates the IP address of the destination on the carrier IP network 106. However, choosing the IP edge node 122 can be based on routing policies. These routing policies are generally configurable based on various criteria such as, but not limited to, device capabilities, load balancing, or device or system settings or connections. Exemplary routing policies are discussed further below, with reference to IP trunk groups, which facilitate implementation of the routing policies.

Figure 2:
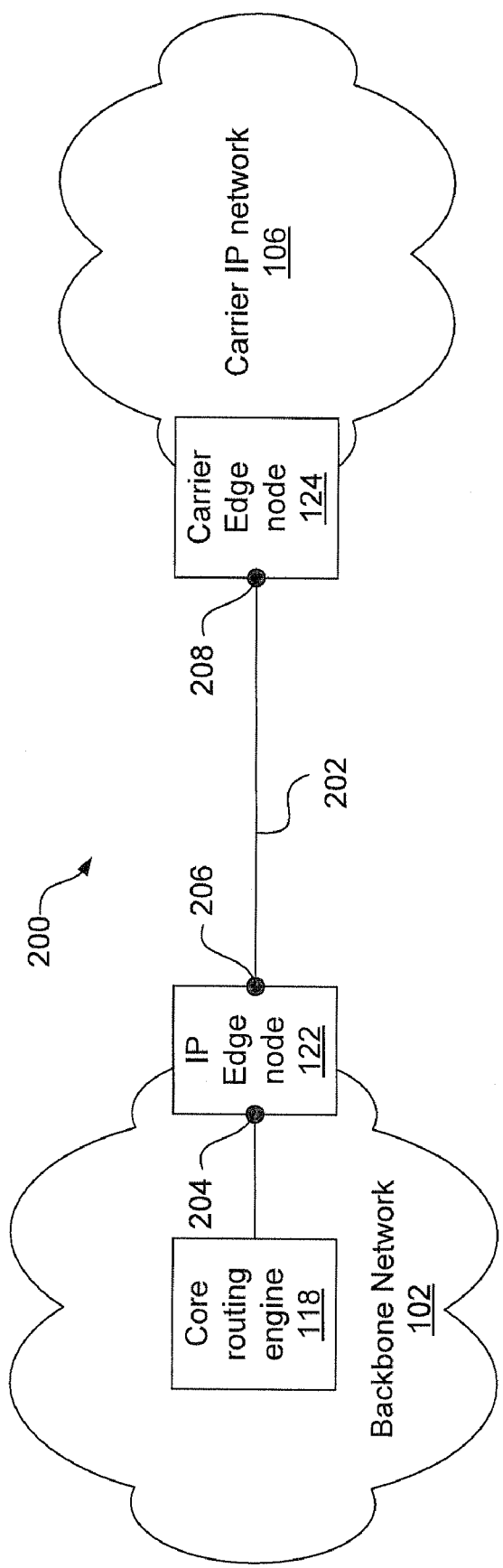
FIG. 2 illustrates one general form of an IP trunk group configuration, in which the edge node of a VoIP backbone network is directly connected to an interface node of a carrier network.
Figure 3:
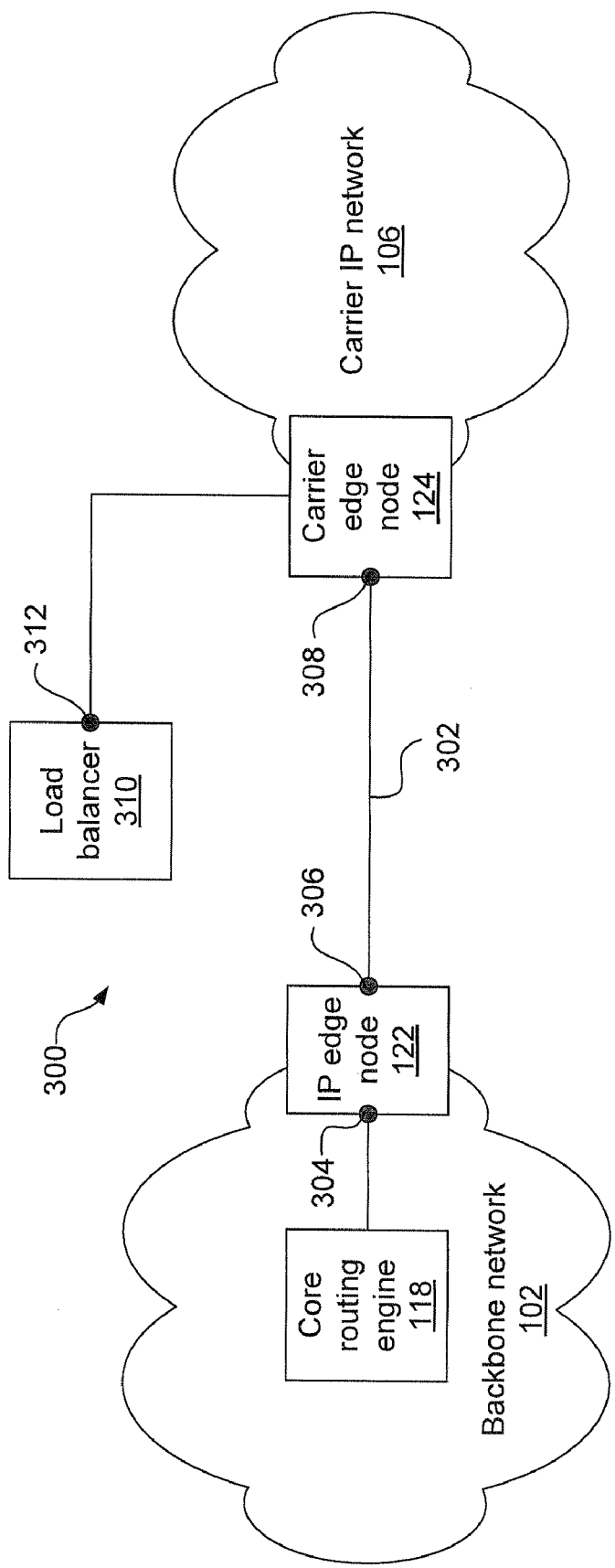
FIG. 3 illustrates another general form of an IP trunk group configuration, in which a load-balancer can be accessed by an interface node of the carrier network to provide load balancing across multiple backbone IP addresses included in an IP trunk group.
Figure 4:
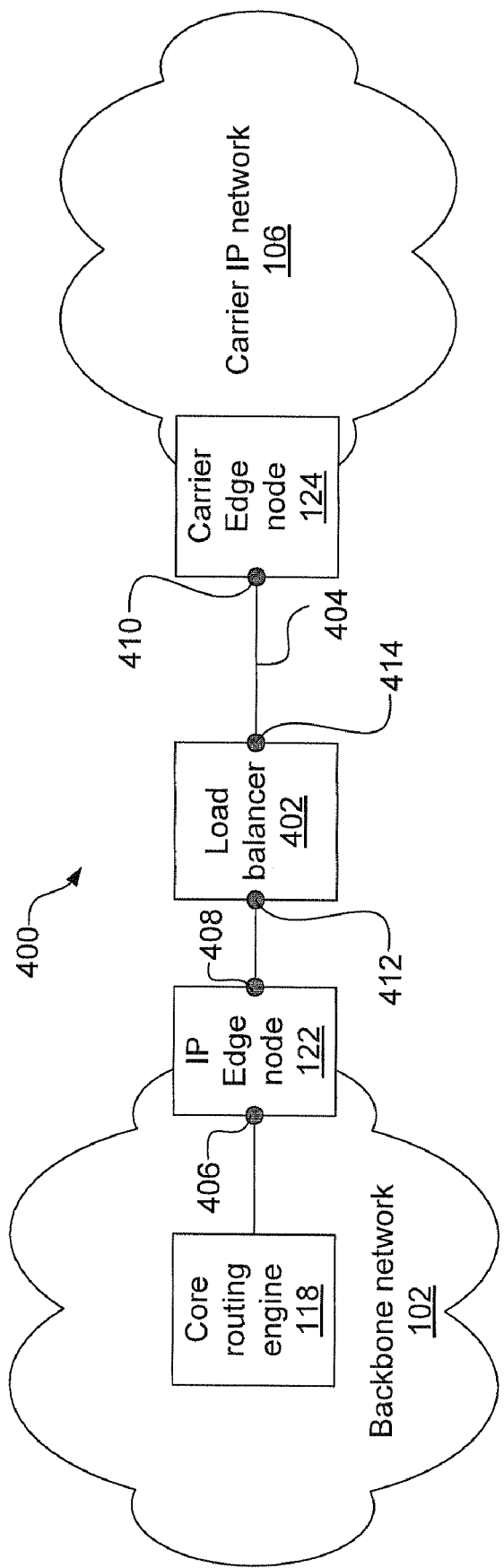
FIG. 4 illustrates yet another general form of an IP trunk group configuration, in which a load-balancer is logically positioned between one or more edge nodes of the backbone network and one or more interface nodes of the carrier network.

FIGS. 2-4 illustrate three basic types of IP interconnections that can form IP trunk groups. The IP interconnections are logical IP interconnections rather than physical. It is to be understood that these are not the only types of IP trunk groups. The exemplary types illustrated in FIGS. 2-4 have been developed with regard to variations in carrier IP network interconnection profiles and equipment capabilities. Selection of a type of IPTG can depend on numerous considerations such as, but not limited to, the ability and willingness of the carrier to support call distribution and load balancing across the backbone IP interconnection edge topology, the ability and willingness of the carrier to use congestion control mechanisms for both inbound and outbound flows, and the ability and willingness of the carrier to normalize SIP signaling in accordance with SIP interface specifications of the backbone network and follow standardized SIP behaviors. While the foregoing are not the only considerations in determining the optimal IPTG interconnection type, they account for some important factors.

FIG. 2 illustrates one possible type of IP interconnection 200 that can form a component of an IP trunk group (IPTG). In this embodiment, the backbone network 102 IP edge node 122 is logically connected to the carrier edge node 124 of the carrier network 106. The type of IP interconnection illustrated in FIG. 2 is referred to as an IP direct interconnection 200. IP direct interconnections 200 are "direct" SIP/IP connections between the backbone network IP edge nodes 122 and the carrier edge nodes 124. The term "direct" is used here merely to distinguish this type of interconnection from other types of interconnections described below that include Load Balancers (LBs). Although the IP interconnection 200 does not utilize LBs, it will be understood that between the IP edge node 122 and the carrier edge node 124 there may be routers and other devices that facilitate communication between the nodes.

An IPTG formed from the IP interconnection type of FIG. 2 can be characterized by a number of elements. The logical path 202 of the interconnection 200 corresponds to the IPTG identification. As discussed further below, the logical path 202 is given a name or other identifier with which the IPTG can be associated and referenced. An internal IP address 204 is a SIP signaling IP address of the IP edge node 122 that controls the IPTG. The internal IP address 204 is private and internal to the backbone network 102. The IPTG is further characterized by the name or other identifier of the IP edge node 122 that controls the IPTG. A public external IP Address 206 of the IP edge node 122 is a SIP signaling IP address that is accessible to one or more carrier edge nodes 124. A public external IP address 208 of the carrier edge node 124 is a SIP signaling IP address involved with the IPTG. The IPTG is further characterized by the name or other identifier of the carrier edge node 124.

In embodiments that use IP direct interconnections 200, the backbone network 102 IP edge node 122 manages the IPTG on both an inbound (i.e., into the backbone network 102 from the carrier IP network 106) and outbound (from the backbone network 102 to the carrier IP network 106) basis. For example, the IP edge nodes 122 determine the appropriate IP originating trunk group (OTG) for the call and pass an OTG identifier to the CRE. With regard to outbound calls, the IP edge nodes 122 translate the provided destination trunk group (DTG) into a specific carrier IP Address (or set of IP addresses).

In addition, for embodiments that use direct IP interconnections 200 the carrier edge node 124 manages load balancing between multiple backbone network 102 IP edge nodes 122 for inbound calls. Likewise, outbound call load balancing between carrier edge nodes 124 is handled by the IP edge nodes 122 at the IP address layer, and the CRE at the IPTG layer. Stated differently, the backbone network 102 CRE 118 balances load between IPTGs while the backbone network 102 IP edge nodes 122 balance load between IP addresses, if there is more than one carrier IP address in the IPTG.

FIG. 3 illustrates another type of IP interconnection 300. This type of IP interconnection 300 uses a SIP re-direct load balancer for inbound calls (i.e., from the carrier network 106 to the backbone network 102), and follows the same convention as the IP direct interconnection type (e.g., 200, FIG. 2) for outbound calls (i.e., from the backbone network 102 to the carrier network 106). The type of IP interconnection shown in FIG. 3 is referred to as an inbound load-balanced IP interconnection 300.

An IPTG that includes an inbound load-balanced IP interconnection can be characterized by a number of elements. The logical path 302 between the carrier edge node 124 and the IP edge node 122 corresponds to the IPTG Identification. As discussed further below, the logical path 302 is given a name or other identifier with which the IPTG can be associated and referenced. An internal IP address 304 is a SIP signaling IP address of the IP edge node 122 that controls the IPTG. The internal IP address 304 is private and internal to the backbone network 102. The IPTG is further characterized by the name or other identifier of the IP edge node 122 that controls the IPTG. A public external IP Address 306 of the IP edge node 122 is a SIP signaling IP address that is accessible to one or more carrier edge nodes 124. A public external IP address 308 of the carrier edge node 124 is a SIP signaling IP address involved with the IPTG. The IPTG is further characterized by the name or other identifier of the carrier edge node 124.

In an inbound load-balanced IP interconnection a SIP re-direct load balancer 310 is employed so that inbound SIP signaling from the carrier edge nodes 124 is balanced across multiple IP edge nodes 122. The IPTG including an inbound load-balanced IP interconnection is further characterized by an IP Address 312 of the SIP re-direct load balancer 310. Inbound load-balanced IP interconnection 300 types are similar to direct IP Interconnections in the sense that in both types the backbone network 102 IP edge nodes 122 manage the IPTG on both an inbound and outbound basis. However, the SIP re-direct load balancer 310 provides a layer of abstraction between the carrier edge nodes 124 and the backbone network 102 edge node 122 topology.

In the inbound load-balanced IP interconnection 300, inbound carrier calls are sent to the SIP re-direct load balancer 310. The LB 310 responds with a 300 MC SIP message containing one or more backbone network 102 IP edge node 122 external IP addresses. The IP edge nodes 122 determine the appropriate origination trunk group (OTG) and pass the OTG's identifier to the CRE 118. As with direct IP Interconnection type, for outbound calls the IP edge nodes 122 translate the provided DTG into a specific carrier edge node IP Address 308 (or set of IP addresses). Outbound call load balancing between the carrier edge nodes 124 is handled by the IP edge nodes 122 at the IP layer, and the CRE 118 at the IPTG layer.

In some embodiments that are not shown, an outbound SIP re-direct load balancer can be employed at the backbone network 102. In this embodiment, the IP edge nodes 122 send calls to the outbound load-balancer (not shown) and the outbound load-balancer responds with one or more external IP addresses of the carrier network edge nodes 124. This type of IP interconnection is referred to as an outbound load-balanced IP interconnection.

In yet another embodiment, both an outbound SIP re-direct load balancer is employed at the backbone network 102 and an inbound SIP re-direct load balancer is employed at the carrier network 106. This type of IP interconnection is referred to as a hybrid load-balanced IP interconnection.

FIG. 4 illustrates yet another type of IP interconnection 400 that can be used in IPTGs. The IP interconnection 400 shown in FIG. 4 is referred to as a SIP proxy load balanced IP interconnection because a SIP proxy load balancer 402 is logically positioned between the IP edge nodes 122 of the backbone network 102 and the carrier edge nodes 124 of the carrier network 106. The SIP proxy load balancer 402 is used for both inbound and outbound calls.

An IPTG that includes a SIP proxy load-balanced IP interconnection 400 can be characterized by a number of elements. The logical path 404 between the carrier edge node 124 and the SIP proxy load-balancer 402 corresponds to the IPTG identification. The logical path 404 is given a name or other identifier with which the IPTG can be associated and referenced. An internal IP address 406 is a SIP signaling IP address of the IP edge node 122 that controls the IPTG. The internal IP address 406 is private and internal to the backbone network 102.

The IPTG is further characterized by the name or other identifier of the IP edge node 122 that controls the IPTG. A public external IP Address 408 of the IP edge node 122 is a SIP signaling IP address that is included in the IPTG. A public external IP address 410 of the carrier edge node 124 is a SIP signaling IP address involved with the IPTG. The IPTG is further characterized by the name or other identifier of the carrier edge node 124 involved with the IPTG.

The SIP proxy load balancer 402 used by the carrier edge nodes 124 is for inbound SIP signaling and the backbone IP edge nodes 122 for outbound SIP signaling. In the embodiment of FIG. 4, the backbone IP edge nodes 122 only partially manage the IPTG. As with the inbound SIP re-direct load balanced type of IP interconnection 300 shown in FIG. 3, the SIP proxy load balanced interconnection 400 provides a layer of abstraction between the carrier edge node and the backbone IP edge node 122 topology. In addition, the SIP proxy load balanced IP interconnection also abstracts the carrier edge node 124 topology and IP addressing from the backbone IP edge nodes 122. Because of this bi-directional abstraction, the management of IPTGs is distributed between the edge nodes 122, 124 and the load balancer(s) 402.

Inbound calls arriving from carrier networks in a SIP proxy load balanced IP interconnection will be directed to a public IP address on the LB 402. The SIP Proxy LB 402 determines the correct IP OTG for the call and chooses the appropriate backbone IP edge node 122 to be used for the call. This selection can be based on varying algorithms to achieve load balancing, geographic POI optimization, etc.

When an inbound call arrives at the backbone IP edge node 122, the call will already contain an IP OTG designation that was determined from the SIP Proxy LB 402. Thus, the backbone IP edge node 122 is not responsible for determining the IP OTG and passes the IP OTG information on to the CRE 118.

With regard to outbound calls from the backbone network 102 on a SIP proxy load balanced IP interconnection 400, the backbone IP edge nodes receive a specified IP DTG to be used for call termination. This IP DTG is resolved into the appropriate SIP Proxy LB 402 IP Address 412, rather than the carrier edge node IP address 410. As such, the backbone IP edge node is responsible for passing the call to the correct SIP Proxy LB 402 while maintaining the specified IP DTG in the call's signaling. Subsequently, the SIP Proxy LB 402 resolves the IP DTG into one or more carrier edge node IP addresses and forwards the call appropriately.

FIGS. 5a-5d illustrate a number of different IP trunk group use scenarios and arrangements. In general, an IP trunk group is defined by one IP address on the edge node of a first network, and one or more IP addresses on one or more edge nodes of a second network.

Figure 5A:
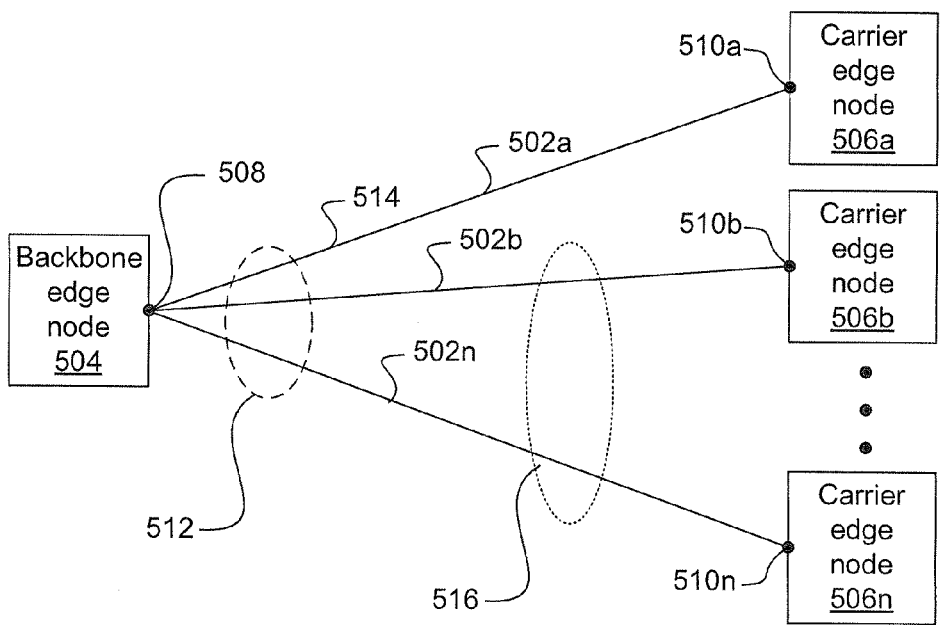
FIGS. 5a-5d illustrate various exemplary scenarios in which Internet Protocol (IP) trunk groups can be used.

In FIG. 5a, multiple IP interconnections 502a-502n exist between an edge node 504 and multiple carrier interface nodes 506a-506n. The edge node 504 has an external IP address 508. Each of the carrier interface nodes 506a-506n have a corresponding external IP address 510a-510n, respectively. In one scenario, a first IP trunk group 512 logically includes interconnections 502a-502n. In another scenario, a second IP trunk group 514 and a third IP trunk group 516 are defined. The second IP trunk group 514 logically includes IP interconnection 502a, while the third IP trunk group 516 logically includes IP interconnections 502b-502n.

Figure 5B:
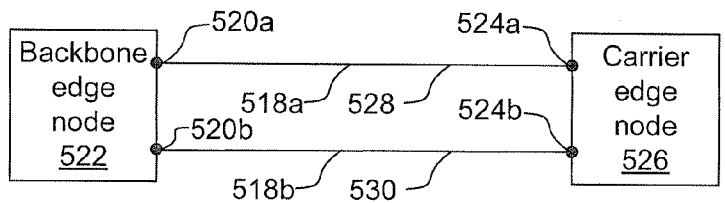

In FIG. 5b, a first IP interconnection 518a exists between a first IP address 520a of a first edge node 522 and a first IP address 524a of a carrier interface node 526. A second IP interconnection 518b exists between a second IP address 520b of the first edge node 522 and a second IP address 524b of the carrier interface node 526. In this scenario, two IP trunk groups are defined. A first IP trunk group 528 logically includes the IP interconnection 518a, and a second IP trunk group 530 logically includes the IP interconnection 518b.

Figure 5C:
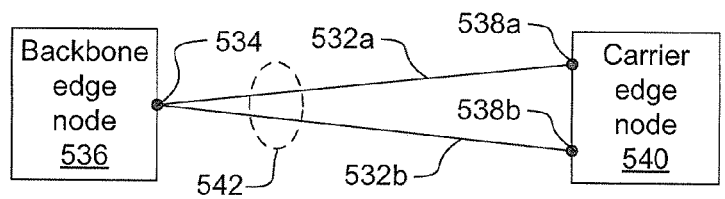

In FIG. 5c, a first IP interconnection 532a exists between an IP address 534 of an edge node 536 and a first IP address 538a of a carrier interface node 540. A second IP interconnection 532b exists between the IP address 534 of the edge node 536 and a second IP address 538b of the carrier interface node 540. Three possible IP trunk groups can be defined given this arrangement. A first IPTG 542 includes both IP interconnection 532a and IP interconnection 532b. A second IPTG includes only IP interconnection 532a, while a third IPTG includes only IP interconnection 532b.

Figure 5D:
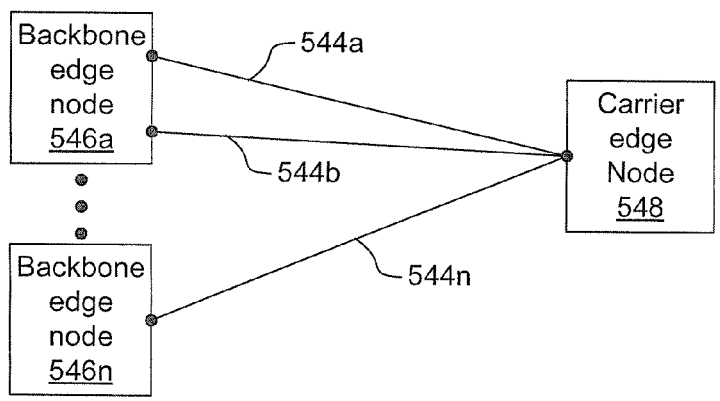

In FIG. 5d, multiple IP interconnections 544a-544n exist between associated backbone IP edge nodes 546a-546n and a single carrier edge node 548. In this arrangement, each IP interconnection 544 can be defined as an IPTG, but more than one of the IP interconnections 544 are not grouped together.

FIG. 6 illustrates an exemplary data structure 600 in the form of a data table, which can be used to store definitions of IP trunk groups. In this embodiment, regardless of the IP interconnection type used, there is a fundamental set of parameters that describe an IPTG for the purposes of call processing, reporting, mediation/billing, and provisioning. A standardized database of records may or may not be used to maintain these IPTG attributes so they can be used by other provisioning, reporting, routing, and configuration systems.

In the table 600, there is a set of attribute names 602, a set of attribute values 604 and a set of constraints 606. With regard to constraints 606, "S" means a Single Value is allowed per IPTG, "M" means that multiple values are allowed per IPTG, U means that a globally unique value is used per IPTG, and "N" means that a non-unique value can appear in multiple IPTGs.

Referring now to the attribute names 602, every trunk group has a trunk group ID (TGID) 608. In the illustrated embodiment, the IPTG TGID field is a numeric value that serves as the overall name or reference for the IPTG. In one embodiment, the TGID is a globally unique value that is generated by an IPTG database when the associated IPTG is created.

An internal IP data field 610 contains a single standard IP address, signaling port, and transport type that denotes where the backbone network internal signaling should be sent to reach a specified IP DTG. Each IPTG typically has a single Internal IP Address assigned to it, as IPTGs do not span multiple stateful edge devices. The internal IP data attribute 610 is used by the CRE in conjunction with the TGID to denote a route choice in the backbone network. The three informational elements of this field can be separated into individual related fields.

A facility name attribute 612 denotes the name of the facility in the backbone network that corresponds to the internal IP address for the TGID. Each IPTG will typically have a single internal IP address assigned to it, as IPTGs do not span multiple stateful edge devices. In various embodiments, the facility name attribute is sized to accommodate a single 30 character alphanumeric value.

An external IP data attribute 614 contains a single IP address, signaling port, and transport type that denotes the backbone IP edge node of the IPTG. The external IP data attribute 614 specifies the public-facing IP address on the backbone network IP edge node for this associated TGID. In this embodiment, each TGID will contain a single value for the backbone network external IP address. In SIP proxy load-balanced IP interconnections, the external IP data attribute will not be used because the IPTG is not anchored to the backbone network IP edge node on the carrier network facing side. The three informational elements of this field can be separated into individual related fields if desired.

A carrier IP data attribute 616 designates IP addressing information for the carrier edge nodes involved with the IPTG. In one embodiment, the IP data value denotes the IP Address(es), signaling port(s), and transport type(s) associated with the TGID. The carrier IP data value may contain multiple sets of IP information per a single TGID. In one embodiment, the carrier IP data is sized to initially accommodate ten sets of IP information and is able to be increased in the future if needed. The information in the carrier IP data field 616 may be separated into multiple related fields if desired.

A carrier facility name attribute 618 designates the facility name of the carrier IP address(es) involved with the IPTG. In this embodiment, there is an associated facility name provided for every IP Address in the carrier IP data attribute 616. In one embodiment, the carrier facility name value is sized to initially accommodate ten facility names, with each facility name up to 20 alphanumeric characters, and the value may be able to be increased in terms of additional facility names in the future if needed.

A size attribute 620 designates the size of the IPTG. In this embodiment, the size value contains a single three digit value that represents the TG's equivalent size in T1s. The size attribute is used by the CRE when performing proportional routing allocation between TGs. In various embodiments, business and process rules are built around how the size value is determined. This may involve applying system safeguards and/or constraints.

A pseudo carrier code (PCC)/customer profile value (CPV) attribute 622 is used by the CRE to apply customized routing on an OTG basis. In one embodiment, the PCC/CPV value contains a single five digit value that represents the TGID's PCC.

An E911 type attribute 624 is used for proper routing of E911 calls for the IPTG by the CRE. In this embodiment, the E911 value contains one of three possible values that represent the TGID's E911 service type:

N/A: this TGID does not require or is not allowed to use E911 service
I2: this TGID requires E911 i2 type routing
TRADITIONAL: this TGID requires traditional CPN type E911 routing A route advance profile attribute 626 specifies a route advance profile related to the IPTG. In one embodiment, the route advance profile value contains a single three digit value that denotes a specified route advance profile. The route advance parameters associated with each profile can be maintained in memory, and can be represented by an alphanumeric identifier, such as a three digit value. In accordance with some embodiments, the route advance profile attribute 626 is only applicable for IPTGs that are Bi-directional or Inbound from a directionality standpoint, and egress-only IPTGs will have a default value of 000 in this field.

A signaling normalization profile attribute 628 is used for signaling normalization designation. In one embodiment the signaling normalization profile attribute 628 value contains a single three digit value that denotes a specified signaling normalization profile. These profiles can be maintained in memory and can be represented by an alphanumeric identifier, such as a three digit value.

A directionality attribute 630 can be used to ensure that systems such as route analysis tools are aware of IPTGs that are available for call termination. In one embodiment, the directionality attribute 630 contains one of three possible values that represent the IPTG's directionality:

B (Bi-directional IPTG that supports both Ingress and Egress use)
E (Egress-only IPTG supporting outbound use (DTG) only)

I (Ingress-only IPTG supporting inbound use (OTG) only)

A hunt sequence attribute 632 designates how an IP edge node should distribute calls across an IPTG when multiple carrier IP addresses exist. In one embodiment, the value for the hunt sequence attribute 632 can take on one of the following values:

P: calls will be sent to the IP addresses as a function of their priority

LB: calls will be evenly distributed between all carrier IP addresses

The hunt sequence value can be used by the backbone edge device that manages the IP DTGs to ensure calls are distributed to carriers in the desired manner.

A regulatory nature attribute 634 indicates the regulatory nature of calls arriving on the IPTG. In one embodiment, the value of the regulatory nature attribute is selected from two possible values E (all calls are considered to be Enhanced)

N (all calls are considered to be Non-Enhanced)

The regulatory nature attribute can be used by various backbone network provider systems to track the regulatory nature of the IP Interconnections.

A carrier ID attribute 636 denotes a carrier identifier for the carrier associated with the IPTG. In one embodiment the carrier ID value contains a single 20 character alphanumeric value representing the carrier's name as a function of other systems within the backbone network provider.

An allowable codecs attribute 638 denotes values associated with codecs and packetization Intervals. In one embodiment, values for the allowable codecs attribute contain up to ten values that denote the desired and/or supported media codec and packetization intervals for the IPTG. Each value may be in the format of codec:packetization (e.g. G.711:20 ms). In one embodiment the allowable codecs value is sized to accommodate ten values, each no larger than 20 alphanumeric characters. The allowable codecs attribute 638 can be used by the backbone network to establish the supported and preferred media types for an IPTG.

A product ID attribute 640 denotes a product associated with the IPTG. In one embodiment, the product ID value contains a single 20 character alphanumeric value related to a the backbone network provider product name.

An interconnection type attribute 642 denotes the type of IP interconnection for the IPTG. Exemplary values for the interconnection type attribute are alphanumeric identifiers associated with the type. Exemplary types are described above, such as direct IP interconnection, SIP inbound re-direct load balanced IP interconnection, and SIP proxy load balanced IP interconnection.

A backbone network load balancer (LB) IP data attribute 644 is used for the SIP load balanced IP interconnection types (e.g., inbound, outbound, hybrid, or proxy). The LB IP data attribute 644 denotes the LB IP addresses, port, and transport mechanism that are associated with the TGID. In this embodiment the field for the value is sized to accommodate four IP addresses.

A backbone network load balance type attribute 646 denotes the type of backbone network load balancing used for the IPTG. In accordance with one embodiment, the load balance type attribute 646 can take on the following values: redirect—related to a SIP re-direct load balanced IP interconnection; and proxy—related to a SIP proxy load-balanced IP Interconnection.

A carrier equipment data attribute 648 contains an alphanumeric value representing the carrier network's equipment (e.g., carrier edge node). In one embodiment, the carrier equipment data attribute value is a single 30 character alphanumeric value. It will be understood that the attributes, fields, data, and formats illustrated in FIG. 6 and described above are for illustration purposes only. The invention is not limited to the illustrated and described implementation.

Figure 7:
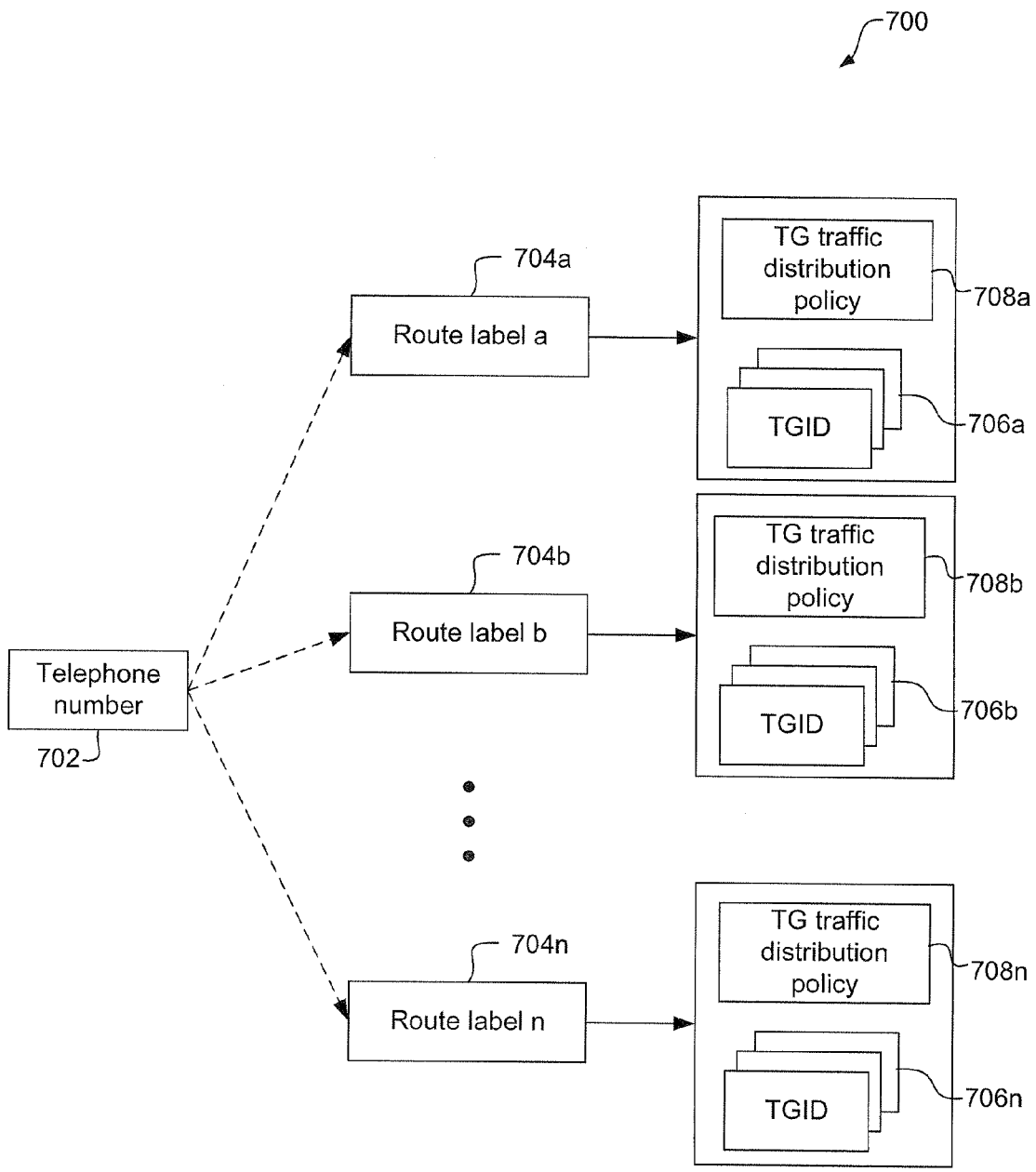
FIG. 7 illustrates a scheme that can be used by a core routing engine to route incoming calls to outbound trunk groups.

FIG. 7 illustrates an exemplary scheme that can be carried out by a core routing engine of a backbone network for routing inbound calls to outbound IP trunk groups in accordance with one embodiment. When a SIP request comes into the core routing engine, the core routing engine extracts the called telephone number 702. The core routing engine then identifies a corresponding route label from among multiple route labels 704*a*-704*n* that are associated with telephone numbers.

Each route label 704 has an associated set of TGIDs 706. For example, route label 704*a* has an associated set of TGIDs 706*a*, route label 706*b* has an associated set of TGIDs 706*b*, and so on. A TGID may or may not be associated with more than one route label 704.

After the core routing engine determines the appropriate route label 704, the core routing engine determines which TGID to which the call should be sent. The core routing engine uses a TG traffic distribution policy 708 associated with the selected route label 704 to choose the TGID. In one embodiment, each TG traffic distribution policy 708 specifies an order in which the TGIDs should be used. Some exemplary traffic distribution policies are round robin, sequential, and percent allocation. Other traffic distribution policies can be used.

Exemplary Operations

Figure 8:
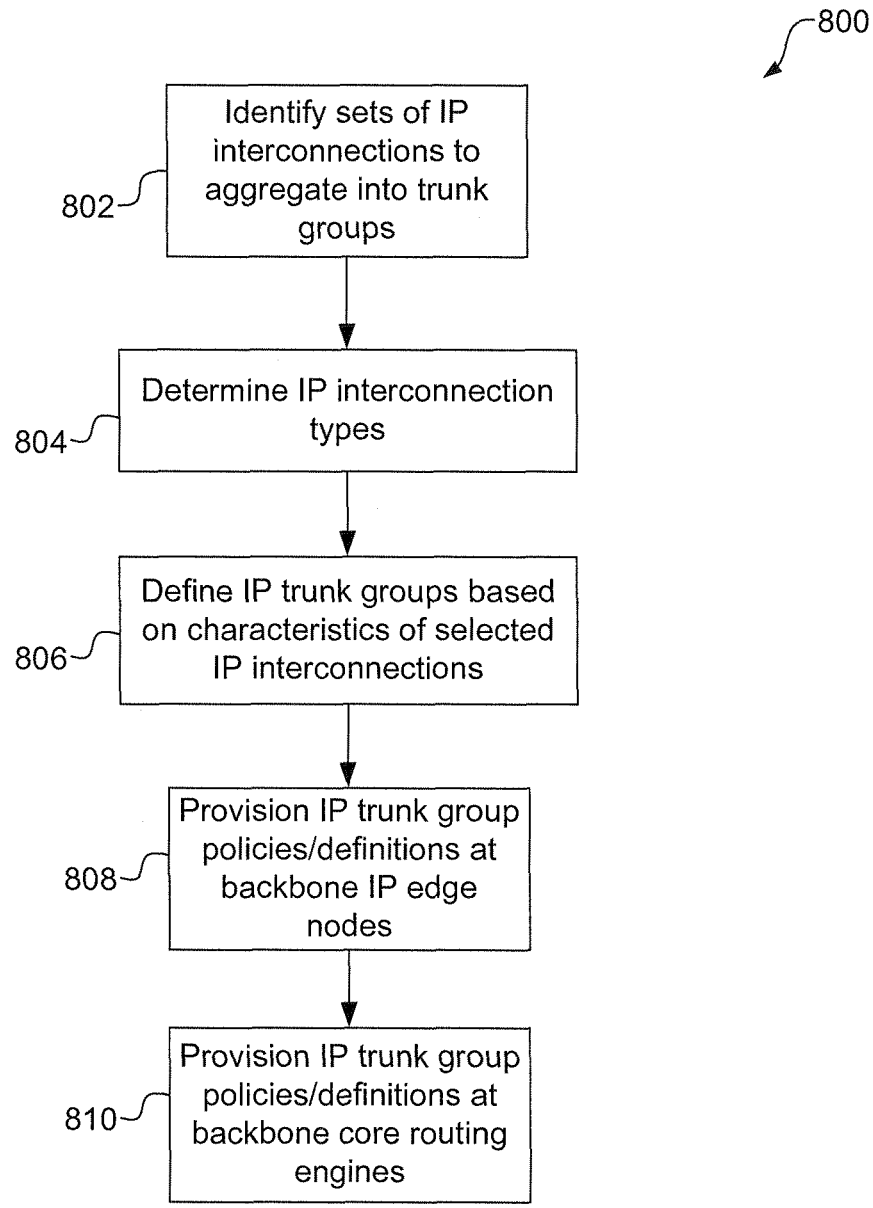
FIG. 8 is a flowchart illustrating an exemplary process for defining and provisioning IP trunk groups in a backbone network.
Figure 9:
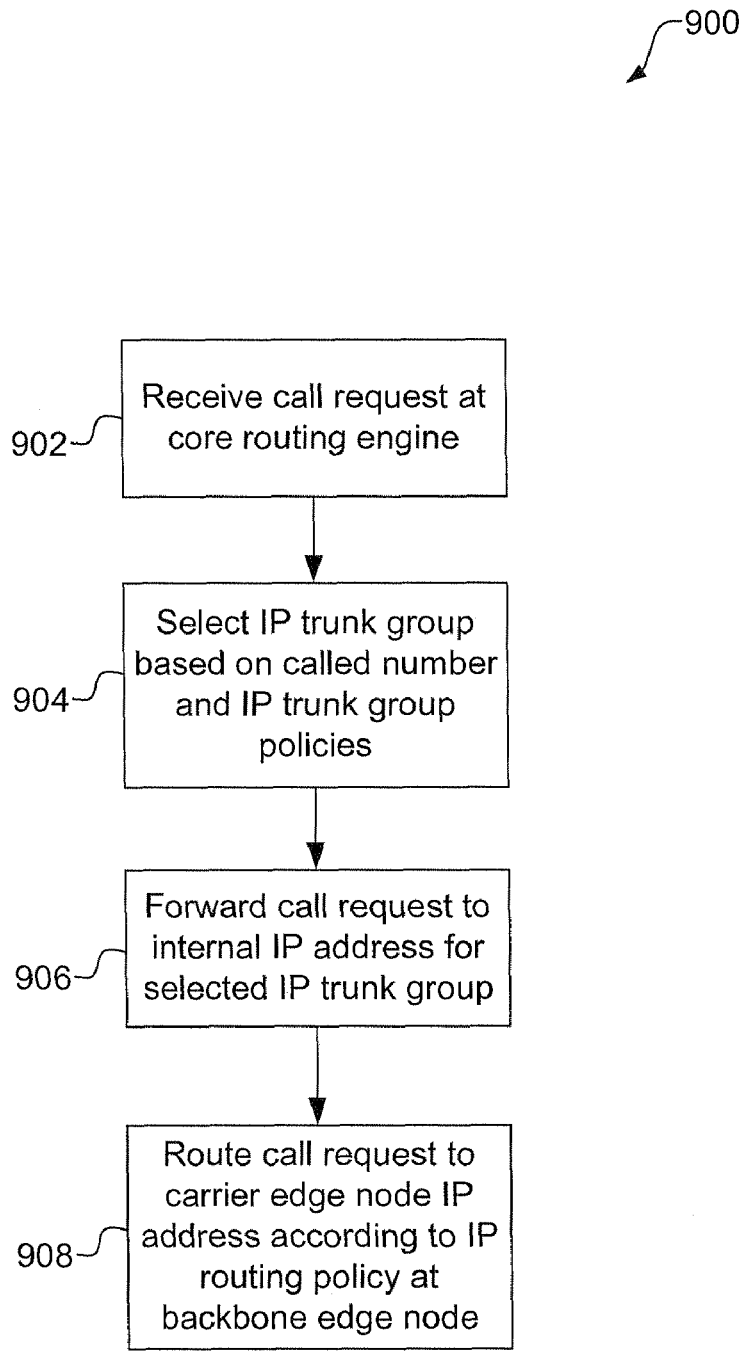
FIG. 9 is a flowchart illustrating an exemplary process carried out by a core routing engine for routing inbound calls to outbound IP trunk groups in accordance with one embodiment.

FIGS. 8-9 illustrate processes that can be carried out to define one or more IP trunk groups and use the defined trunk groups for routing calls through a backbone network. One or more of the operations shown in FIGS. 8-9 can be embodied in a computer program product and executed by a computing device, such as a core routing engine, an edge proxy server, or a session border controller. The particular order of the operations shown is not absolute. Some of the operations can be rearranged, merged, and/or broken out into multiple operations, depending on the particular implementation, without departing from the scope of the present invention.

In FIG. 8, a process 800 is illustrated for defining one or more IPTGs. In and identifying operation 802, one or more sets of IP interconnections are identified, wherein each set can properly and desirably be aggregated into associated IP trunk groups. Each set of IP interconnections includes one or more IP interconnections. Generally, IP interconnections that are grouped together are logically similar or have commonalities that might offer economies of scale in grouping the interconnections to together, but this is not necessary.

A determining operation 804 determines an IP interconnection type for each of the sets of IP interconnections identified in operation 802. Some exemplary IP interconnection types are described above, but others may be developed and used in the determining operation 804. A defining operation 806 defines an IP trunk group for each set of one or more IP interconnections that were identified in operation 802. In one embodiment, the defining operation 806 involves selecting values for a plurality of attributes such as those shown in FIG. 6. The defining operation 806 also involves specifying one or more policies, such as traffic distribution policies (at the IPTG level and at the IP address level), E911 routing policies, directionality policies, and so on.

A provisioning operation 808 provisions the IPTG definitions and policies to one or more backbone network IP edge nodes. Another provisioning operation 810 provisions the IPTG definitions at one or more backbone network core routing engines. Provisioning may involve storing the definitions in a database accessible by the core routing engines and the edge nodes, or otherwise configuring the core routing engines and the edge nodes with the IPTG definitions. After the IPTG definitions are provisioned at the core routing engines and the edge nodes, they are used for routing calls through the backbone network.

FIG. 9 illustrates one possible algorithm 900 for routing calls through a backbone network using IPTGs. In a receiving operation 902, a core routing engine receives a call request. The call may come in on a TDM trunk through a PSTN gateway, which forwards the request to the core routing engine. The core routing engine accesses a set of routing labels to determine where and how to route the call. In a selecting operation 904, the core routing engine selects an IP trunk group from a number of defined IPTGs. Selecting the IPTG is based at least in part upon the called telephone number and one or more policies associated with the IPTGs.

A forwarding operation 906 forwards the call request to the selected IPTG. More specifically, the forwarding operation 906 sends the call request to an internal IP address associated with the selected IPTG. A routing operation 908 is carried out by an edge node that received the call request. In the routing operation 908, the edge node determines which IP address to route the call request to. The IP address may be associated with a carrier edge node or a SIP proxy load balancer. An IP address of a carrier edge node may be obtained from a redirection device such as a DNS server or a SIP redirector load balancer.

Exemplary Computing Device

Figure 10:
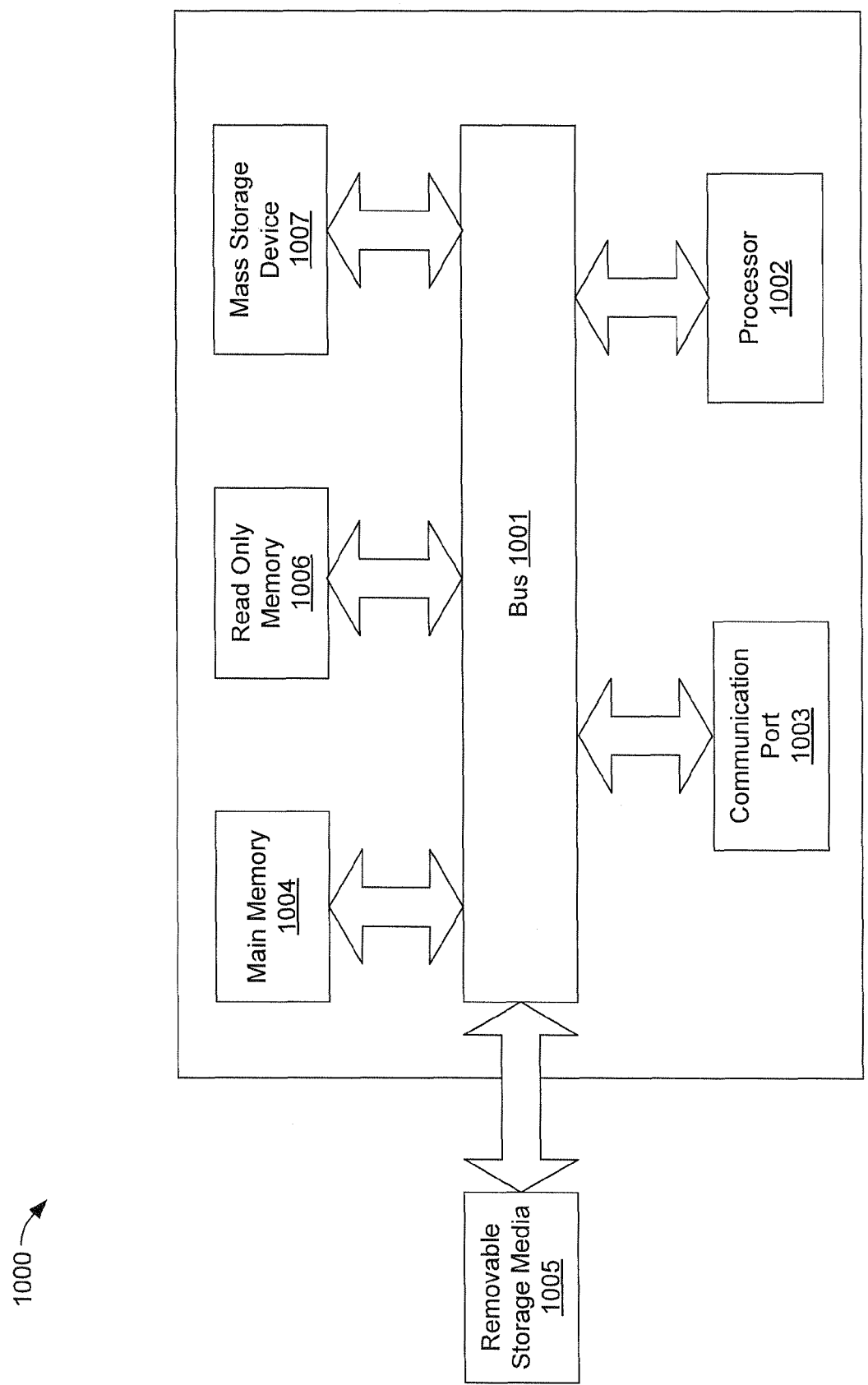
FIG. 10 illustrates a general purpose computing device upon which embodiments of the present invention can execute.

FIG. 10 is a schematic diagram of a computing device 1000 upon which embodiments of the present invention may be implemented and carried out. As discussed herein, embodiments of the present invention include various steps. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

According to the present example, the computing device 1000 includes a bus 1001, at least one processor 1002, at least one communication port 1003, a main memory 1004, a removable storage media 1005, a read only memory 1006, and a mass storage 1007. Processor(s) 1002 can be any know processor, such as, but not limited to, an Intel® Itanium® or Itanium 2® processor(s), AMD® Opteron® or Athlon MP® processor(s), or Motorola® lines of processors. Communication port(s) 1003 can be any of an RS-232 port for use with a modem based dialup connection, a 10/100 Ethernet port, a Gigabit port using copper or fiber, or a USB port. Communication port(s) 1003 may be chosen depending on a network such a Local Area Network (LAN), Wide Area Network (WAN), or any network to which the computing device 1000 connects. The computing device 1000 may be in communication with peripheral devices (not shown) such as, but not limited to, printers, speakers, cameras, microphones, or scanners.

Main memory 1004 can be Random Access Memory (RAM), or any other dynamic storage device(s) commonly known in the art. Read only memory 1006 can be any static storage device(s) such as Programmable Read Only Memory (PROM) chips for storing static information such as instructions for processor 1002. Mass storage 1007 can be used to store information and instructions. For example, hard disks such as the Adaptec® family of SCSI drives, an optical disc, an array of disks such as RAID, such as the Adaptec family of RAID drives, or any other mass storage devices may be used.

Bus 1001 communicatively couples processor(s) 1002 with the other memory, storage and communication blocks. Bus 1001 can be a PCI/PCI-X, SCSI, or USB based system bus (or other) depending on the storage devices used. Removable storage media 1005 can be any kind of external harddrives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Based on the disclosure provided herein, one of ordinary skill in the art will appreciate a myriad of behaviors that may be quantified using the presented approach. Further, based on the disclosure provided herein, one of ordinary skill in the art will recognize a variety of ways that the aforementioned information may be used.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A system for routing IP-based calls through a backbone network to a carrier network, the system comprising:

a core routing engine operable to receive a call setup request and identify one or more IP trunk groups through which the call setup request can be routed, based at least in part on a telephone number in the call setup request, the core routing engine further operable to select one of the one or more identified IP trunk groups and route the call setup request to an internal IP address associated with the selected IP trunk group; and an IP edge node associated with the internal IP address, the IP edge node in the backbone network and operable to receive the call setup request and route the call setup request to one of a plurality of IP addresses associated with a plurality of carrier edge nodes in the carrier network;

a memory including a plurality of IP trunk group definitions, wherein the memory is accessible by one or more of the core routing engine and the IP edge node; and wherein each of the IP trunk group definitions comprises a data structure comprising:

a first field designating an IP trunk group identifier;

a second field designating an internal IP address associated with the first IP-based network;

a third field designating an external IP address associated with the first IP-based network;

a fourth field designating an IP address associated with the second IP-based network;

a fifth field designating a group size;

a sixth field designating a group route advance profile;

an seventh field designating a signaling normalization profile;

a eighth field designating a directionality indicator;

a ninth field designating a hunt sequence; and a tenth field designating an allowable codecs indicator.

2. A system as recited in claim 1, wherein the data structures each further comprise an eleventh field designating a facility name associated with the first IP-based network.

3. A system as recited in claim 1, wherein the data structures each further comprise an eleventh field designating a facility name associated with the second IP-based network.

4. A system as recited in claim 1 wherein, wherein the data structures each further comprise an eleventh field designating a pseudo carrier code.

5. A system as recited in claim 1 wherein, wherein the data structures each further comprise an eleventh field designating an emergency services routing type.

6. A system as recited in claim 1 wherein, wherein the data structures each further comprise an eleventh field designating regulatory nature data.

7. A system as recited in claim 1, wherein the data structures each further comprise an eleventh field designating a second IP-based network identifier.

8. A system as recited in claim 1, wherein the data structures each further comprise an eleventh field designating a product identifier.

9. A system as recited in claim 1, wherein the data structures each further comprise an eleventh field designating an IP interconnection type associated with the IP trunk group.

10. A system as recited in claim 1, wherein the data structures each further comprise an eleventh field designating a load balancer IP address.

11. A system as recited in claim 1, wherein the data structures each further comprise an eleventh field designating a load balancer type.

12. A system as recited in claim 1, wherein the data structures each further comprise an eleventh field designating a second IP-based network edge node type.

13. A method for routing an Internet Protocol (IP)-based call through a first IP-based network to a second IP-based network, the method comprising:
  receiving an IP-based call request in the first IP-based network;
  identifying one or more IP trunk groups that can be used to route the call request out of the first IP-based network, wherein each of the one or more IP trunk groups represents a logical grouping of one or more IP interconnections between the first IP-based network and the second IP-based network, wherein identifying one or more IP trunk groups comprises accessing one or more IP trunk group definitions, wherein each of the IP trunk group definitions comprises a data structure comprising:
    a first field designating an IP trunk group identifier;
    a second field designating an internal IP address associated with the first IP-based network;
    a third field designating an external IP address associated with the first IP-based network;
    a fourth field designating an IP address associated with the second IP-based network;
    a fifth field designating a group size;
    a sixth field designating a group route advance profile;
    a seventh field designating a signaling normalization profile;
    a eighth field designating a directionality indicator;
    a ninth field designating a hunt sequence; and
    a tenth field designating an allowable codecs indicator;
  selecting one of the one or more IP trunk groups; and
  routing the received call request to an IP address associated with the selected IP trunk group.

14. A method as recited in claim 13 wherein each of the IP trunk group definitions comprises a data structure including a facility name associated with the first IP-based network.

15. A method as recited in claim 13 wherein each of the IP trunk group definitions comprises a data structure including a facility name associated with the second IP-based network.

16. A method as recited in claim 13 wherein each of the IP trunk group definitions comprises a data structure including a pseudo carrier code.

17. A method as recited in claim 13 wherein each of the IP trunk group definitions comprises a data structure including an emergency services routing type.

18. A method as recited in claim 13 wherein each of the IP trunk group definitions comprises a data structure including a regulatory nature data.

19. A method as recited in claim 13 wherein each of the IP trunk group definitions comprises a data structure including a second IP-based network identifier.

20. A method as recited in claim 13 wherein each of the IP trunk group definitions comprises a data structure including a product identifier.

21. A method as recited in claim 13 wherein each of the IP trunk group definitions comprises a data structure including an IP interconnection type associated with the IP trunk group.

22. A method as recited in claim 13 wherein each of the IP trunk group definitions comprises a data structure including a load balancer IP address.

23. A method as recited in claim 13 wherein each of the IP trunk group definitions comprises a data structure including a load balancer type.

24. A method as recited in claim 13 wherein each of the IP trunk group definitions comprises a data structure including a second IP-based network edge node type.

25. A method as recited in claim 13 further comprising:
  selecting one of the one or more IP trunk groups, wherein selecting the one of the one or more IP trunk group is based on an IP trunk group (IPTG) traffic distribution policy specifying how to distribute calls among IPTGs within a set of IPTGs and the IPTG traffic distribution policy is selected from a group consisting of: sequential; round robin; and percentage allocation.

* * * * *